US011951444B2

(12) United States Patent
Hagqvist

(10) Patent No.: US 11,951,444 B2
(45) Date of Patent: Apr. 9, 2024

(54) WATER FILTER UNIT

(71) Applicant: Bluewater Sweden AB, Stockholm (SE)

(72) Inventor: Peter Hagqvist, Stockholm (SE)

(73) Assignee: BLUEWATER SWEDEN AB, Stockholm (SE)

( * ) Notice: Subject to any disclaimer, the term of this patent is extended or adjusted under 35 U.S.C. 154(b) by 407 days.

(21) Appl. No.: 17/602,236

(22) PCT Filed: Apr. 8, 2020

(86) PCT No.: PCT/SE2020/050371
§ 371 (c)(1),
(2) Date: Oct. 7, 2021

(87) PCT Pub. No.: WO2020/209782
PCT Pub. Date: Oct. 15, 2020

(65) Prior Publication Data
US 2022/0176318 A1 Jun. 9, 2022

(30) Foreign Application Priority Data
Apr. 10, 2019 (SE) .................................. 1950446-3

(51) Int. Cl.
*B01D 61/02* (2006.01)
*B01D 61/08* (2006.01)
(Continued)

(52) U.S. Cl.
CPC .......... *B01D 61/08* (2013.01); *B01D 61/025* (2013.01); *B01D 61/10* (2013.01); *C02F 1/441* (2013.01);
(Continued)

(58) Field of Classification Search
CPC ...... B01D 61/08; B01D 61/025; B01D 61/10; B01D 2311/2523; B01D 2313/16;
(Continued)

(56) References Cited

U.S. PATENT DOCUMENTS 3,708,069 A * 1/1973 Clark ................... B01D 63/066
 210/321.87
3,963,616 A * 6/1976 Parsons ................ B01D 63/069
 210/321.89
(Continued)

FOREIGN PATENT DOCUMENTS

| CN | 105944571 A | 9/2016 |
|---|---|---|
| DE | 3308348 A1 | 9/1984 |
| EP | 0414082 A1 | 2/1991 |

OTHER PUBLICATIONS

European Search Report from corresponding European application No. 20788024.6, dated Oct. 20, 2022, 7 pages.
(Continued)

*Primary Examiner* — Joseph W Drodge
(74) *Attorney, Agent, or Firm* — Ronald M. Kachmarik; Cooper Legal Group LLC

(57) ABSTRACT

A water filter unit for purifying water fed to the water filter unit. The unit includes a containment defined by a wall section, first and second end sections, wherein the wall section is attached to the first end section and the second end section; a water inlet arranged in the first or second end section through which the water is fed into the containment; a filter membrane arranged in the containment such that at least part of the water is fed through the filter membrane; and a first water outlet for filtered water from the membrane. The unit further includes an injector pump arranged to create an increased flow velocity trough the injector pump of the water fed to the filter membrane, and the injector pump is furthermore arranged to receive unfiltered water not fed (Continued)

through the membrane and recirculate the unfiltered water within the containment.

16 Claims, 6 Drawing Sheets

(51) Int. Cl.
    *B01D 61/10* (2006.01)
    *C02F 1/44* (2023.01)
(52) U.S. Cl.
    CPC .. *B01D 2311/2523* (2022.08); *B01D 2313/16* (2013.01); *B01D 2313/243* (2013.01); *B01D 2313/90* (2013.01); *C02F 2301/046* (2013.01)
(58) Field of Classification Search
    CPC .......... B01D 2313/243; B01D 2313/90; B01D 2201/208; B01D 2321/2066; B01D 29/90; B01D 29/88; B01D 35/26; B01D 63/062; B01D 63/065; B01D 2201/206; C02F 1/441; C02F 2301/046; C02F 2201/004; C02F 2301/024; C02F 1/44
    See application file for complete search history.

(56) References Cited

U.S. PATENT DOCUMENTS

| | | | |
|---|---|---|---|
| 4,741,841 A | | 5/1988 | Borre et al. |
| 5,320,755 A | * | 6/1994 | Hagqvist ................ B01D 61/22 210/90 |
| 10,099,179 B2 | | 10/2018 | Volker |
| 10,106,441 B2 | | 10/2018 | Matani |
| 10,781,576 B2 | | 9/2020 | Lahuerta Romeo |
| 2003/0222011 A1 | | 12/2003 | Almasian et al. |
| 2008/0190870 A1 | | 8/2008 | Schoeb |
| 2009/0173690 A1 | * | 7/2009 | Oklejas, Jr. ............ B01D 61/12 210/194 |
| 2013/0292334 A1 | | 11/2013 | Rapoport |
| 2014/0238936 A1 | * | 8/2014 | Fazel ................... B01D 61/025 210/636 |

OTHER PUBLICATIONS

Indian Examination Report from corresponding Indian application No. 202117047263, dated Sep. 29, 2023, 6 pages.

International Search Report from corresponding International Application PCT/SE2020/050371 dated Apr. 30, 2020, 5 pages.

* cited by examiner

WATER FILTER UNIT

BACKGROUND

Reverse Osmosis (RO), a water treatment method traditionally known for removing salt from seawater, is also used to purify drinking water by forcing untreated water molecules through a semi-permeable filter membrane. The filter membrane blocks contaminants and the impurities are subsequently expelled from the environment.

It is a process where a weaker saline solution will tend to migrate to a strong saline solution; that is, a solution that is less concentrated will have a natural tendency to migrate to a solution with a higher concentration. Reverse osmosis occurs when the solution is moved across a filter membrane against the concentration gradient, from lower concentration to higher concentration. For example, under normal osmosis, a semipermeable filter membrane with fresh water on one side and a concentrated aqueous solution on the other side would have the freshwater cross the filter membrane to dilute the concentrated solution. In reverse osmosis, pressure is exerted on the side with the concentrated solution to force the water molecules across the filter membrane to the lower concentration side.

A typical reverse osmosis water filtering system uses a semi-permeable filter membrane that has the ability to remove and reject a wide spectrum of impurities and contaminants from water. These contaminants are automatically rinsed down the drain. The purified water may then be stored in a tank.

The predetermined pressure is applied to the incoming water to force the incoming water through the filter membrane. The filter membrane filters impurities from the incoming water leaving purified water on the other side of the filter membrane, which is referred to as "permeate" stream. The impurities left on the membrane are washed away by a portion of the incoming water that does not pass through the membrane. The water carrying the impurities washed away from the membrane is called "concentrate stream."

Some of the benefits of employing a RO system include: pure, clean drinking water, removal of unwanted odors or tastes.

It is common to have RO systems comprising several filter units connected in series. Some of the unfiltered water may be flowing passed the filter membrane in a first filter unit without it passing through the filter membrane, hence this water is still uncleaned. Subsequently, this unfiltered water may be recirculated into the same, first filter unit, or into a second filter unit in connection, preferably in series, with said first filter unit.

Having a RO system comprising several units and a pump for recirculating the water may be space consuming. The circulation pumps may also malfunction due to mechanical and/or electrical failure, and hence replacement or repair of the pump may be imminent. After some time, the RO filter may also need to be replaced, a common problem on the market is that the consumer may use spare parts not approved by the manufacturer instead of the approved replacement parts.

SUMMARY OF THE INVENTION

Hence, it is of interest to overcome at least some of the deficiencies of present water filter arrangements, in order to improve its functionality.

This and other objects are achieved by providing a water filter unit having the features in the independent claim. Preferred embodiments are defined in the dependent claims.

According to a first aspect of the present invention, there is provided a water filter unit for purifying pressurized water fed to the water filter unit, said water filter unit comprising;
a containment defined by a wall section, a first end section and a second end section, wherein the wall section is attached to the first end section and the second end section;
a water inlet arranged in said first or second end section through which the pressurized water is fed into the containment;
a filter membrane arranged in said containment such that at least part of the water is fed through the filter membrane;
a first water outlet for filtered water from the membrane;
wherein the water filter unit further comprises an injector pump arranged to receive the pressurized water and create an increased flow velocity trough the injector pump of said pressurized water fed to the filter membrane, and said injector pump is furthermore arranged to receive unfiltered water not fed through the membrane and recirculate said unfiltered water within the containment.

Thus, the present invention is based on the idea of providing a water filter unit for purifying water having a pump arranged with the filter unit for enhancing filter functionality. The injector pump comprises no moving parts under operation in order to create the increased flow velocity. Hence, this may provide a filter unit without any moving parts. There will be a drop in pressure over the injector pump that may create a suction effect primarily affecting the unfiltered water within the filter. More specifically this may provide a pump without any moving parts for increasing the flow velocity of said pressurized water through the injector pump and recirculating the unfiltered water within the filter by creating a suction effect affecting the unfiltered water to have it recirculated. This may provide an increased flow through the filter membrane.

This may provide a water filter requiring no maintenance or a very low amount of maintenance since there may be no moving parts within the filter nor the injector pump. This may also provide a compact water filter.

According to an embodiment the water filter unit may further comprise an elongated pipe with a perforated wall connected to the first water outlet, wherein the filter membrane may be a reverse osmosis filter membrane arranged around said elongated pipe and the filtered water enters the elongated pipe via the perforations in the elongated pipe when using the water filter unit.

This may provide for a compact solution of a water filter. This may also provide for a high performing water filter unit able to clean water from high amount of dirt or impurities.

According to an embodiment the water filter unit may further comprise a channel arranged for transporting the pressurized water and the recirculated water from said injector pump to said filter membrane, wherein said channel may be arranged within the elongated pipe such that a passage between said elongated pipe and said channel may be formed.

This may provide for a facilitated transportation and/or recirculation of uncleaned water within the filter unit.

According to an embodiment the channel may be in connection with said injector pump, and wherein said channel may be arranged off-centered within said elongated pipe at least at one end of said elongated pipe.

This may provide for facilitated assembly of the water filter unit since there will be an increased amount of space for the outlet to be attached. In turn, this may provide for improved functionality of the water filter unit since an outlet with a larger cross-section may be possible.

According to an embodiment the injector pump may comprise the water inlet and a narrowing passage, wherein the narrowing passage has a diameter, D2, and the water inlet has a diameter, D1, wherein D2 may be smaller than D1.

According to an embodiment the injector pump comprises a second inlet passage, the narrowing passage may be arranged at a distance, H, from the center of said second inlet passage (240), wherein said distance H may be within the range −1*D1 to 1.5*D1 and said injector pump may be furthermore arranged to receive unfiltered water through said second inlet passage.

At least some of the above embodiments may provide for an increased flowrate and/or flow velocity through the injector pump. At least some of the above embodiments may further provide for the unfiltered water to be sucked into the channel and recirculated within the filter unit.

According to an embodiment the ratio D1/D2 may be at least 3, more preferably at least 4 most preferably at least 5.

This may provide for a desired flowrate and/or flow velocity through the injector pump compared to that of the pressurized water fed to the containment. This may provide the flow rate and/or flow velocity through the injector pump to be preferably around at least twice, more preferably around three times, most preferably around four times, the flowrate and/or flow velocity of the pressurized water fed to the containment.

According to an embodiment at least part of the wall section may be attached to at least part of the filter membrane.

This may provide for decreased amount of water within the filter unit getting stuck, not being part of the flow of water within the filter unit. This may provide a decreasing risk for the unfiltered water to leak, passing the filter membrane without passing through the filter membrane.

According to an embodiment the injector pump may be arranged within said containment and wherein; said injector pump 150 may be further arranged to receive the pressurized water from the water inlet 120.

This may provide for a compact water filter unit.

According to an embodiment the water filter unit comprises a second outlet for at least part of the unfiltered water.

This may provide for additional recirculation of the uncleaned water. This may also provide for adjustable outflow of clean water when the feed pump has a constant flow.

According to an embodiment the water filter unit further comprises a capillary tube enabling venting of the water filter unit.

This may provide for facilitated venting of the water filter unit if needed, since air might be transported with the water entering the water filter unit. If there is a substantial amount of air accumulated within the water filter unit, the functionality may be substantially decreased. Hence, capillary tubes for venting the water filter unit may also provide for improved functionality of the water filter unit.

According to an embodiment the wall section may be permanently sealed to at least one of the first end section and the second end section.

This may provide for a leak proof containment of the filter unit. The fact that the containment may be permanently sealed provide for improved reliability of that the filter unit since the filter unit only will contain components assembled and approved by the manufacturer.

According to an embodiment there may be provided a water purification system comprising at least one water filter unit according to any preceding embodiment of present invention and a feed pump for feeding pressurized water to said at least one water filter unit.

According to an embodiment the feed pump feeds the pressurized water to the at least one water filter unit using a pulsating pressure.

This may provide for improved functionality of the filter unit because of turbulence being induced by the pulsating pressure from the feed pump. The turbulence helps keeping particles from not getting stuck in the filter membrane and hence this may provide for a reduced requirement for maintenance and hence a longer lifespan for a possibly sealed water filter unit may be provided.

According to a second aspect of present invention there may be provided a method of manufacturing a water filter unit according to previous embodiments, wherein the filter membrane may be arranged around an elongated pipe; wherein said method comprises connecting the injector pump to a channel;
assembling the injector pump, with the channel connected, to the filter membrane so that said channel may be arranged within said elongated pipe creating a passage between said elongated pipe and said channel;
assembling the wall section to the filter membrane;
assembling a first end section and a second end section to said wall section creating a filter housing;
sealing said first end section to said wall section and said wall section to said second end section;

This provides for a method of manufacturing a water filter unit according to the present inventive concept. This may provide a water filter requiring no maintenance or a very low amount of maintenance since there may be no moving parts within the filter nor the injector pump. This may also provide a compact water filter since the injector pump may be arranged within said containment, i.e. within said water filter unit.

According to an embodiment the method may also comprise;

applying a connection to the second end section;
connecting a vacuum pump to the water inlet and
connecting a container for uncured curable plastic to said connection;
evacuating said filter housing with said vacuum pump so that said curable plastic may be sucked into said second section of said filter housing;

This may provide for a decreasing risk of unused water or "dead" water within the filter unit. Without the curable plastic there may be an increasing risk of pockets to be built up that may trap part of the water within the filter, i.e. disturbing the circulation of the water within the filter. This may provide for a properly sealed container.

DETAILED DESCRIPTION

Figure 1:
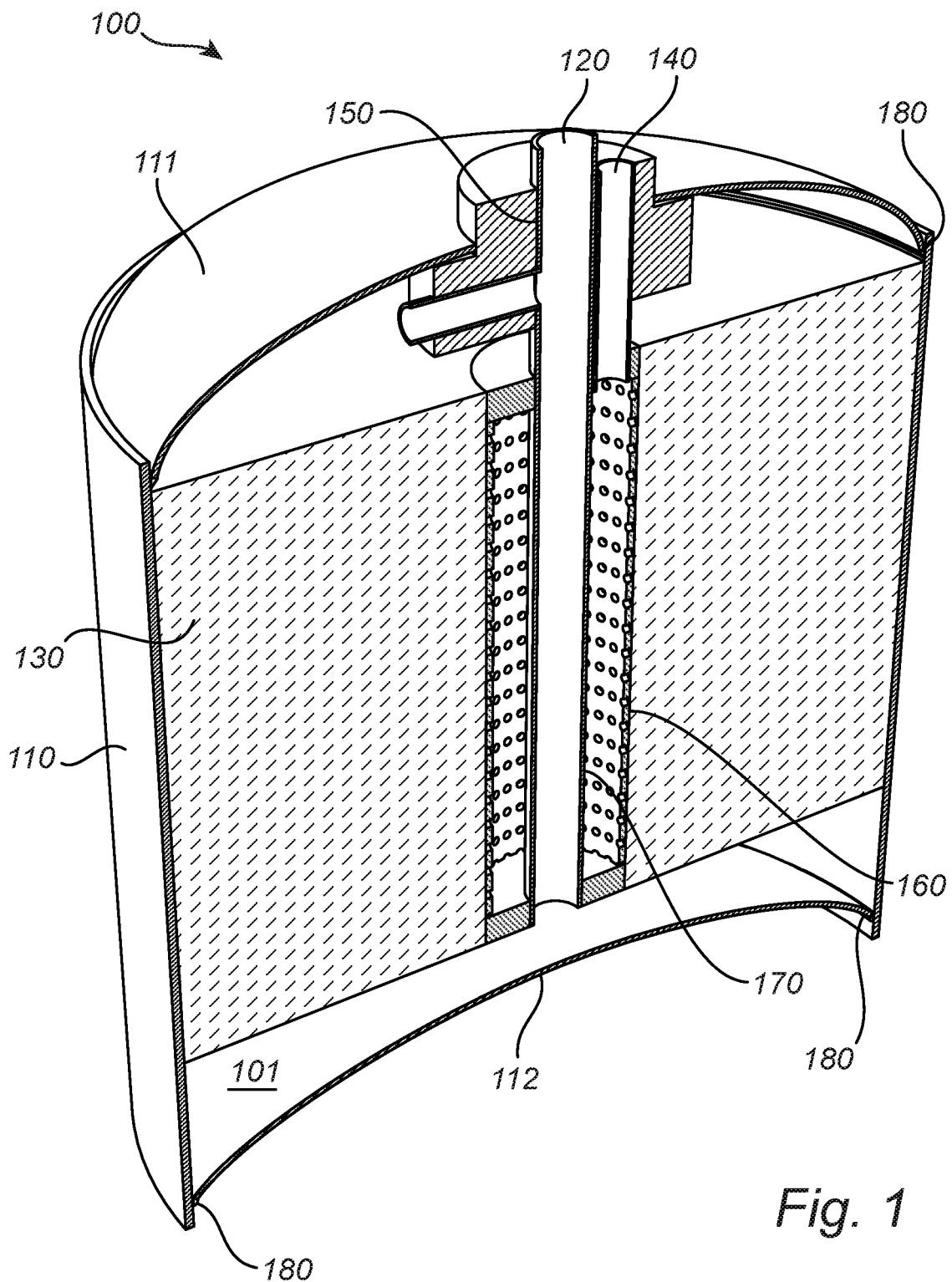
FIGS. 1, 2a and 2b schematically illustrate a water filter unit according to at least one possible embodiment of present invention.

FIG. 1 schematically illustrates a water filter unit 100 according to at least one possible embodiment of present invention. FIG. 1 shows a water filter unit 100 for purifying pressurized water fed to the water filter unit. The water filter unit 100 comprising a containment 101 defined by a wall section 110, a first end section 111 and a second end section 112, wherein the wall section 110 is attached to the first end section 111 and the second end section 112. The water filter unit 100 in FIG. 1 further comprises a water inlet 120 arranged in said first end section 111. It should be understood that the water inlet 120 may also be arranged in said second end section 112. The water filter unit 100 further comprises a filter membrane 130 arranged in said containment 101 such that at least part of the water is fed through the filter membrane 130. The water filter unit 100 comprises a first water outlet 140 for filtered water from the membrane. The water filter unit 100 further comprises an injector pump 150 arranged to create an increased flow velocity trough the injector pump of said pressurized water fed to the filter membrane 130. The injector pump 150 is furthermore arranged to receive unfiltered water not fed through the membrane and recirculate said unfiltered water within the containment 101.

Thus, the present invention is based on the idea of providing a water filter unit 100 for purifying water having a pump arranged with the filter unit for enhancing filter functionality. The injector pump 150 comprises no moving parts under operation in order to create the increased flow velocity. Hence, this may provide a filter unit without any moving parts. There will be a drop in pressure over the injector pump 150 that may create a suction effect primarily affecting the unfiltered water within the filter unit 100. More specifically this may provide a pump without any moving parts for increasing the flow velocity of said pressurized water through the injector pump 150 and recirculating the unfiltered water within the filter by creating a suction effect affecting primarily the unfiltered water to have it recirculated.

This may provide a water filter requiring no maintenance or a very low amount of maintenance since there may be no moving parts within the filter nor the injector pump 150. This may also provide a compact water filter.

The injector pump may be at least partly arranged in one of the first end section and the second end section. I.e. the injector pump may be at least partly arranged in one of the first end section and the second end section to receive the pressurized water and create an increased flow velocity trough the injector pump of said pressurized water fed to the filter membrane.

The pressurized water fed to the filter water may also be referred to as feed water. The cleaned water exiting the filter unit after passing through the filter membrane 130 may also be known as the permeate.

The wall section 110 may be permanently sealed to the first end section 111 and/or the second end section 112 to ensure a leak proof containment of the filter unit. The fact that the containment may be permanently sealed provide for increased reliability of that the filter unit since the filter unit only will only contain components assembled and approved by the manufacturer.

By the word injector pump 150 may here be meant a pump without any moving parts. In other words, the injector pump 150 may comprise no moving parts. Hence, the injector pump 150 may be free of moving parts in order to create an increase flow velocity trough the injector pump 150. In other words, the injector pump 150 may comprise only fixed parts. In other words, the pump 150 may comprise only stationary parts. In other words, the injector pump 150 may comprise stationary or fixed parts in order to create the increased flow velocity through the pump. Known names for such injector pump 150 according to present invention are injector pump, aspirator, water injector, educator-jet pump, venturi pump and water educator. The significant part of the injector pump 150 according to present invention may thus be a pump without any moving parts.

FIG. 1 also shows an elongated pipe 160 with a perforated wall connected to the first water outlet 140 that may be present according to some embodiments of the present invention. The filter membrane 130 in FIG. 1 may according to at least some embodiments according to the present invention be a reverse osmosis filter membrane 130 arranged around said elongated pipe 160, as illustrated in FIG. 1. The filtered water enters the elongated pipe 160 via the perforations in the elongated pipe 160 when using the water filter unit.

In other words, the water gets filtered and cleaned when penetrating the filter membrane 130. The filter membrane 130 may be arranged such that the cleaned water subsequently enters the perforations in the elongated pipe 160 when using the water filter unit.

This may provide for a compact solution of a water filter. This may also provide for a high performing water filter unit 100 able to clean water from high amount of dirt or impurities.

Also shown in FIG. 1 is that the water filter unit 100 may further comprise a channel 170 arranged for transporting the pressurized water and the recirculated water from said injector pump 150 to said filter membrane 130. The channel 170 may be arranged within the elongated pipe 160 such that a passage between said elongated pipe 160 and said channel 170 may be formed.

This may provide for a facilitated transportation and/or recirculation of uncleaned water within the filter unit. In other words, the pressurized water fed to the water filter unit 100 enters the injector pump 150 and may be transported by said channel 170 to the water filter membrane 130. The injector pump 150 may be arranged at least partly within the filter unit. The pressurized water may be transported by the channel 170 within the perforated pipe arranged within the filter membrane 130 to the side of the filter membrane 130 comprising unclean water when the filter unit is in use. Subsequently the pressurized water will either penetrate the filter membrane 130 or pass the filter membrane 130 as uncleaned water and be recirculated within the filter unit to once again approach the filter membrane 130. The part of the pressurized water that penetrates the filter membrane 130 is cleaned by the filter membrane 130 and may further be transported through the perforations in the elongated pipe 160. The channel 170 may be arranged centered within the elongated pipe 160.

With continued reference to FIG. 1, the injector pump 150 may be arranged within the containment 101. The inlet of the injector pump 150 may be arranged downstream from the inlet of the water filter unit. In other words, when the pressurized water enters the filter unit 100 through the water inlet 120 the pressurized water subsequently enters the injector pump 150. The pressurized water may be transported via the injector pump 150 to the upstream side of the filter membrane 130 after entering the inlet of the water filter unit. By having the injector pump 150 arranged within said containment 101 a compact solution may be provided.

As earlier mentioned the wall section 110 may be permanently sealed to the first end section 111 and the second end section 112. Because of the novel construction of the present invention of having the provided compact solution with an injector pump 150 arranged within the filter unit and that the injector pump 150 comprises no moving parts. It is made possible to permanently seal the filter unit which may be beneficial in some applications. Because of no moving parts in the injector pump 150 the need of maintenance and repair of the filter unit may be at least reduced or may even be eliminated.

Figure 2A:
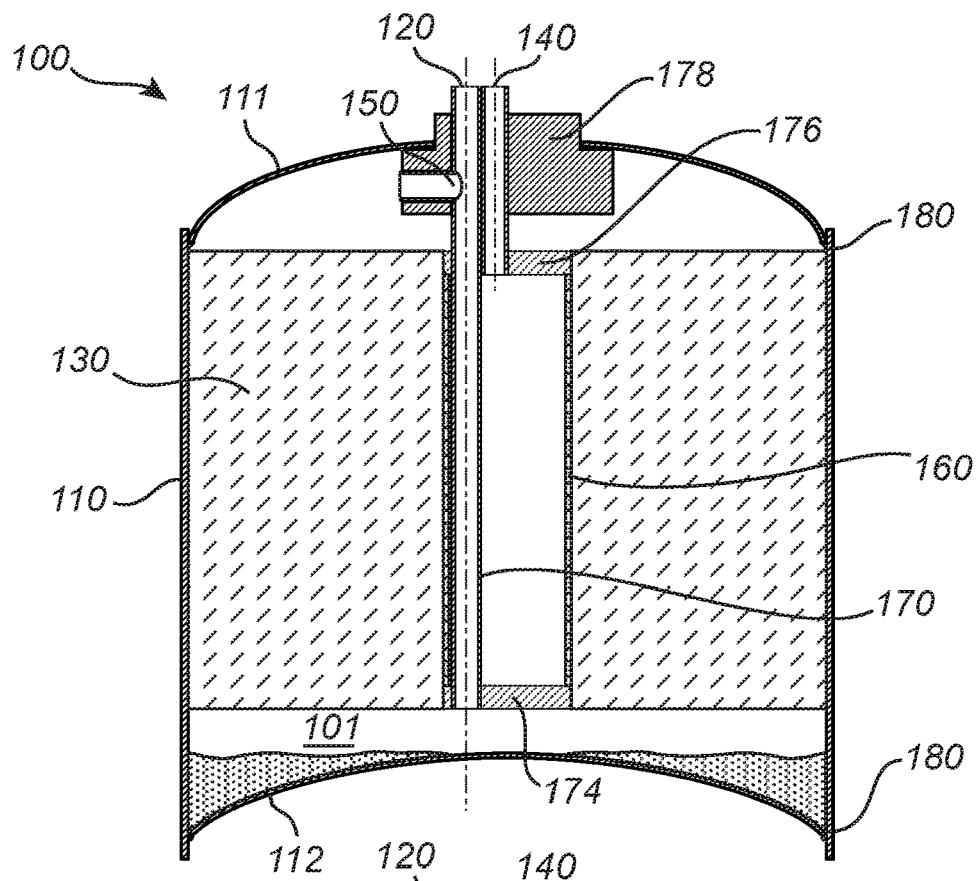
Figure 2B:
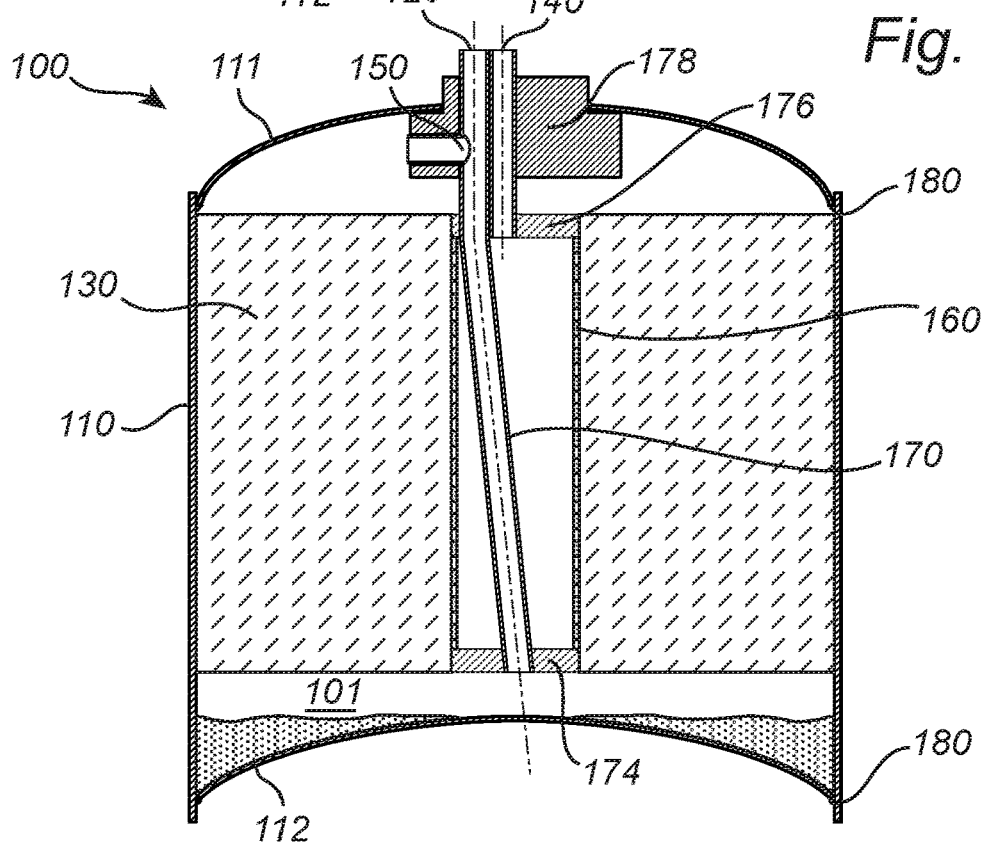

FIGS. 2a-2b schematically illustrates a water filter unit 100 according to at least one possible embodiment of present invention. FIGS. 2a and 2b show the channel 170 in connection with said injector pump 150. The channel 170 in FIG. 2a is arranged off-centered within said elongated pipe 160. The channel 170 in FIG. 2b is arranged off-centered within said elongated pipe 160 at one end of said elongated pipe 160. In other words, the channel 170 may be arranged off-centered within parts of the elongated pipe 160. The channel 170 may be diagonally arranged within the elongated pipe 160. The channel 170 may also be arranged off-centered within and along the whole elongated pipe 160. This may provide for facilitated assembly of the water filter unit 100 since there will be an increased amount of space for the outlet to be attached. In turn, this may provide for improved functionality of the water filter unit 100 since an outlet with a larger cross-section is possible. When the channel 170 is arranged off-centered when in connection to the injector pump 150 a facilitated connection with the first water outlet 140 may be achieved.

As seen in FIGS. 1 and 2a-2b and described above the channel 170 may be arranged in connection to the injector pump 150 at one end of the channel 170. The opposing end of the channel may be in connection to the upstream side of the filter membrane. The channel 170 may be arranged in connection to the injector pump 150 in one of said end sections 111,112 and be in connection to the upstream side of the filter membrane in the other end of said channel. In FIGS. 1 and 2a-2b the injector pump is arranged in said first end section 111. In the opposite end of the channel 170, the channel 170 is in connection to the upstream side of the filter membrane in said second end section 112. One end of the channel 170 may thus be arranged in connection to the injector pump 150 at said first end section and arranged in connection to the second end section 112 in the opposing end of the channel 170.

In other words, the channel 170 may have two ends, a first and second end. Said first end may be arranged in connection to said injector pump 150 in said first end section 111 and said second end may be arranged in connection to said second end section 112.

In order to prevent uncleaned water to leak from the upstream side, or the feed water side, to the clean water side, or the permeate side, the channel may be sealed to the elongated pipe in at least one end of said channel, preferable in both ends. In FIGS. 1 and 2a-2b the channel is sealed to the elongated pipe in both ends.

In said first end of said channel 170 the seal may be constituted by a first filter end part 176. In FIGS. 1 and 2a-2b the channel is sealed to the elongated pipe 160 by first being sealed the first filter end part 176 which in turn may be sealed to the elongated pipe by a rubber seal and/or by welding.

In said second end of the channel the channel may be sealed to the elongated pipe 160 by a second filter end part 174 enclosing the channel 170, the second filter end part 174 may be sealed to the elongated pipe 160 by a rubber seal or by welding.

Figure 3:
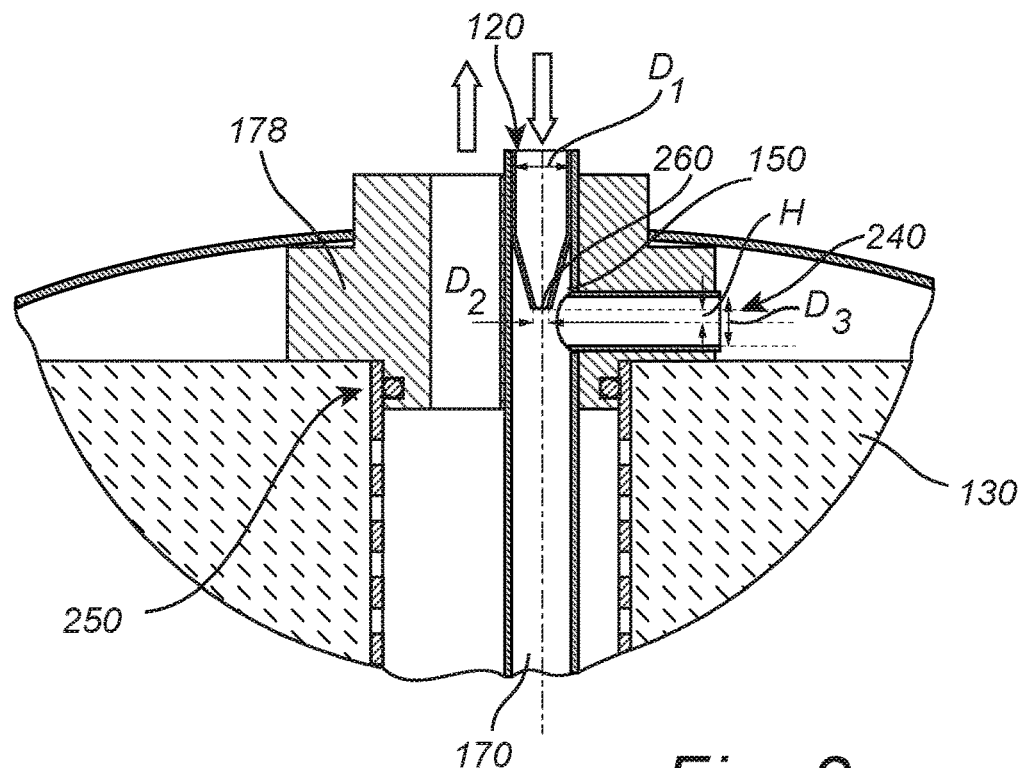
FIG. 3 schematically illustrates a close-up on the injector pump and parts of the filter unit.

In said first end of said channel 170 the seal may be constituted by a connecting piece 178 for the injector pump 150 according to some embodiments of present invention, which can be seen in FIG. 3. In FIG. 3 the channel 170 is enclosed by the connecting piece 178, the connecting piece 178 may then be sealed to the elongated pipe 160 by a rubber seal 250. The connecting piece 178 may be sealed to the elongated pipe 160 by welding and/or by a rubber seal.

This may prevent uncleaned water to leak from the upstream side, or the feed water side, to the clean water side, or the permeate side.

At least part of the wall section 110 may be attached to at least part of the filter membrane 130. In other words, at least a part of the wall section 110 may be attached to at least part of an outer part of the filter membrane 130. By the word "attached" may here be meant sealed or permanently attached. The outer part of the filter membrane 130 may be any part of the surface area enclosing the filter membrane 130. The filter membrane 130 may be attached to the wall section 110 such that the majority of the surface area enclosing the filter membrane 130 is attached to the wall section 110. The filter membrane 130 may be attached to the wall section 110 such that the whole surface area enclosing the filter membrane 130 is attached to the wall section 110. The filter membrane 130 may be attached to the wall section 110 along a region enclosing the filter membrane 130. The filter membrane 130 may be of cylindrical shape. The filter membrane 130 may have a top and a bottom portion. The filter membrane 130 may be attached to the wall section 110 in the transition 180 between the surface area and the top and/or bottom portion of the filter membrane 130.

This may provide for decreased amount of water within the filter unit getting stuck, not being part of the flow of water within the filter unit. This may provide a decreasing risk for the unfiltered water to leak, passing the filter membrane 130 without passing through the filter membrane 130.

The connection between the injector pump 150 and the filter membrane 130 may be welded or connected by screwing part of the injector pump 150 into the elongated pipe 160 of the filter membrane 130. The connection between the injector pump 150 and the filter membrane 130 may be connected by inserting part of the injector pump 150 into the elongated pipe 160 of the filter membrane 130 clamping the injector pump 150 by the first or second section pressing down being attached to the wall section 110.

The wall section 110 may be permanently sealed to at least one of the first end section 111 and the second end section 112. The wall section 110 may be welded to the first end section 111 and/or the second end section 112.

FIG. 3 schematically illustrates a close-up on the injector pump 150 and parts of the filter unit. FIG. 3 show the water inlet 120 and a narrowing passage 260 in the injector pump 150. The narrowing passage 260 may have a diameter, $D2$, and the water inlet may have a diameter, $D1$, wherein $D2$ is smaller than $D1$. The injector pump may be partly located outside the filter unit 100 or the whole injector pump may be located inside the filter unit 100. By the whole injector pump being located inside the filter unit it may be meant that the injector pump is arranged within the containment 101 and/or in at least one of the parts defining the containment 101, i.e. the wall section 110, the first and second end sections 111, 112. The injector pump 150 may be arranged at least partly in at least one the first end section 111 and the second end section 112. Also, the injector pump 150 may be partly arranged in the first or second end section 111, 112 and partly arranged in the containment 101. Further, the injector pump 150 may be partly arranged outside the filter unit 100, partly arranged in at least one of the first and second end section 111, 112, and partly within the containment 101.

Further, the injector pump 150 may comprise a first inlet passage. The first inlet passage may be in fluid connection to the water inlet 120 of the filter unit 100. The first inlet passage of the injector pump may be arranged within the water inlet 120 of the filter unit 100.

The first inlet passage of the injector pump 150 may be the same as the water inlet 120 of the filter unit 100. In other words, the injector pump 150 may comprise the water inlet 120. Hence, the injector pump 150 may be at least partly arranged in at least one of the first and second end section 111, 112 and comprise the water inlet 120.

FIG. 3 also shows a second inlet passage 240 of the injector pump 150. Said second inlet passage 240 may be arranged downstream from the narrowing passage 260. The second inlet passage 240 may be arranged upstream from the narrowing passage 260 or parallel to the narrowing passage 260. The injector pump 150 may furthermore be arranged to receive unfiltered water through said second inlet passage 240. In other words, unfiltered water that has passed the filter membrane 130 without penetrating it will enter the second inlet passage 240 and get transported by means of the injector pump 150 and the channel 170 to the upstream side of the filter membrane 130. In other words, unfiltered water that has passed the filter membrane 130 without penetrating it will be recirculated to the upstream side of the filter membrane 130 by means of the injector pump 150 and the channel 170.

The channel 170 may be arranged downstream from the narrowing passage 260. The channel 170 may have a second inlet passage 240 substantially perpendicular to the channel 170. The second inlet passage 240 may be arranged at a distance H, from the center of the second inlet passage 240 to the narrowing section 260. The distance, H, between the narrowing passage 260 and the center of the second inlet passage 240 may preferably be in the range −1*D1 to 1.5*D1 more preferably in the range −0.7*D1 to 1*D1, most preferably in the range −0.4*D1 to 0.6*D1, where D1 is the diameter of the first inlet passage of the injector pump 150. A negative distance, H, from the center of the inlet passage 240 to the narrowing passage 240 means that the narrowing section will be positioned further downstream compared to a positive distance, H. Further, the distance, H, may be in the range −2*D1 to 0*D1 or −2*D1 to −1*D1. Diameter, D3, of the second inlet passage 240 may preferably be equal to or less than the diameter of the first inlet passage. The distance, H, may also be in the range −3*D3 to −½*D3, alternatively in the range −2*D3 to −1*D3. Hence, the narrowing passage 260 may be arranged downstream from the second inlet passage 240. There may be a plurality of water inlet passages arranged to receive pressurized water converging to at least one narrowing passage 260. There may be a plurality of water inlet passages arranged to receive unclean water for recirculation. The sum of collected cross sectional area of the connecting inlets for pressurized water may preferably be larger than the sum of collected cross sectional area of the connecting inlets arranged to receive unclean water for recirculation. The sum of collected cross sectional area of the connecting inlets for pressurized water may preferably at least twice as big as the sum of collected cross sectional area of the connecting inlets arranged to receive unclean water for recirculation.

The injector pump 150 being arranged as described above and illustrated in FIGS. 1-2 may provide for an increased flowrate and/or flow velocity through the injector pump 150 and may further provide for the unfiltered water to be sucked into the channel and recirculated within the filter unit.

The ratio D1/D2 may be at least 1.4, more preferably may it be at least 1.7 most preferably may it be at least 2.

Preferably, D1 may be within the range of 10-12 mm and D2 may be within the range of 1.7-2.5 mm.

As seen in FIG. 3, the water inlet 120 and said first water outlet 140 may be in connection with the elongated pipe. The water inlet 120 and said first water outlet 140 may be sealed to the elongated pipe by a seal 250. The seal may be achieved by welding the water inlet 120 and said first water outlet 140 to the elongated pipe 160. The water inlet 120 and said first water outlet 140 may be held in place by the first or second section. The seal may be a rubber seal, such as a o-ring seal, in between the elongated pipe and the water inlet 120 and said first water outlet 140 in order to prevent water from entering the elongated pipe without passing the filter membrane.

When welding the water inlet 120 and said first water outlet 140 to the elongated pipe 160 larger connections are possible since this embodiment will need lesser space, since the demand for insertion of the water inlet 120 and said first water outlet 140 into the elongated pipe may not be as high as when sealing with a o-ring seal.

The water inlet 120 and said first water outlet 140 may be arranged in a connecting arrangement holding the connections in place. The connecting arrangement may be connected to the elongated pipe by welding or by applying a rubber seal, such as an o-ring seal, in between the elongated pipe and the connecting arrangement in order to prevent water from entering the elongated pipe without passing the filter membrane. Part of the elongated pipe and/or the connecting arrangement may be threaded, i.e. part of the elongated pipe and/or the connecting arrangement may comprise a threaded section, and the connecting arrangement may be screwed into the elongated pipe 160.

When welding the connecting arrangement to the elongated pipe 160 larger connections for the water inlet 120 and said first water outlet 140 are possible since this embodiment will need lesser space, since the demand for insertion of the connection arrangement into the elongated pipe may not be as high as when sealing with a o-ring seal.

Figure 4A:
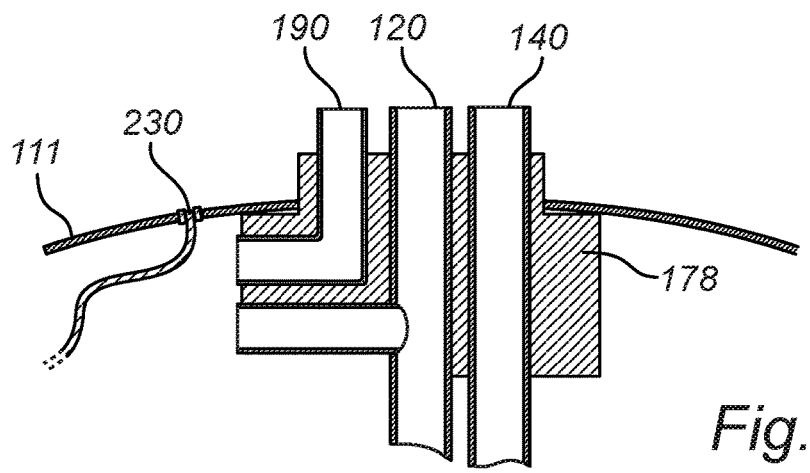
FIGS. 4a-4c schematically illustrate a water filter unit according to at least one possible embodiment of present invention.
Figure 4B:
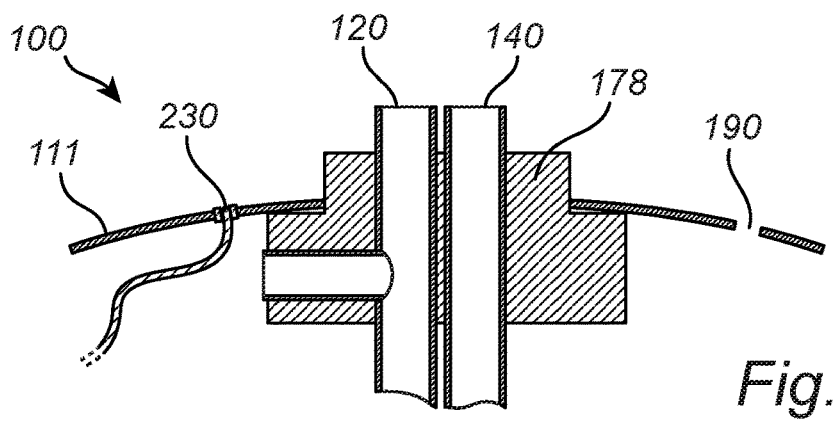

FIGS. 4*a*-4*b* schematically illustrates a water filter unit 100 according to one embodiment of the present invention. FIG. 4 shows a second outlet 190 of the water filter unit 100 for at least part of the unfiltered water. In other words, a second outlet 190 may be provided to transport at least part of the unfiltered water away from said filter unit. By transporting at least part of the unfiltered water away from the filter unit another possibility of recirculating the uncleaned water may be provided. This may also provide for adjustable outflow of clean water, depending on for example the size of the second outlet 190, when the feed pump has a constant flow when the filter unit is in use. In connection with the second outlet 190 an adjustable valve may be connected in order to control flow of unclean water from the filter unit. When a constant flow from the feed pump is used lesser amount of clean water may exit the filter when higher amount of unclean water exits the filter unit.

FIGS. 4a-4b also illustrates that the water filter unit 100 further comprises a capillary tube 230 enabling venting of the water filter unit.

A facilitated venting of the water filter unit 100 may be desirable since air might be transported with the water entering the water filter unit. The capillary tube 230 may be connected on any of the sides suitable for venting, preferably on a side of the filter unit facing upwards, in a direction opposite to the direction of gravity, when the filter unit is in use. The capillary tube 230 may be arranged the filter unit 100 so that venting of the filter unit may be enabled. If there is a substantial amount of air accumulated within the water filter unit 100 when in use, the functionality may be substantially decreased. Hence, the capillary tube 230 for venting the water filter unit 100 may provide for increased functionality of the water filter unit 100 when in use.

The second outlet 190 may be positioned in said first end section 111 and/or said second end section 112. The water inlet 120 and/or the first water outlet 140 may be connected to the connecting piece 178. The second outlet 190 may be connected to the connecting piece 178. Said connecting piece 178 may be positioned within the containment 101 or partly outside the containment 101. The connecting piece 178 may be forced and held in place by the first or second end section 112, when said first or second end section 112 is attached to the wall section 110. The connecting piece 178 may be welded to the first or second end section 111,112. There may be o-ring seals, sealing the connection between the connecting piece 178 and the first or second end section 111,112.

The injector pump 150 has a feed pressure of preferably at least 2 bar, more preferably at least 3 bar, most preferably at least 4 bar. This may provide the injector pump 150 to function without electrical components since the pressure from the feed pump drives the injector pump 150.

Figure 4C:
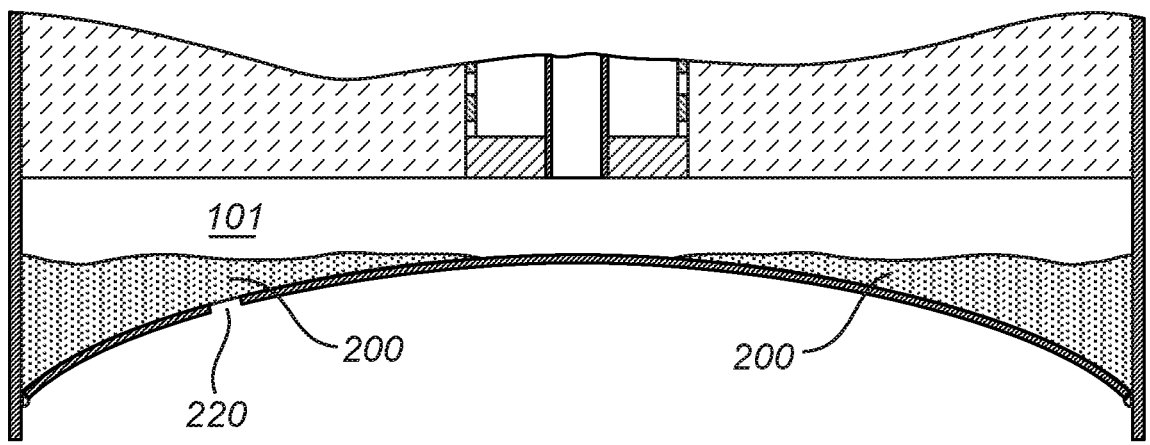

FIG. 4c schematically illustrates a water filter unit 100 according to at least one example embodiment of present invention. In FIG. 4c the second end section 112 comprises a connection 220 for filling curable plastic material 200.

This may provide for a facilitated sealing of the filter unit. The curable plastic material may be thermosetting plastic or any plastic material suitable to be cured with time such as different type of epoxy or equivalent.

Figure 5:
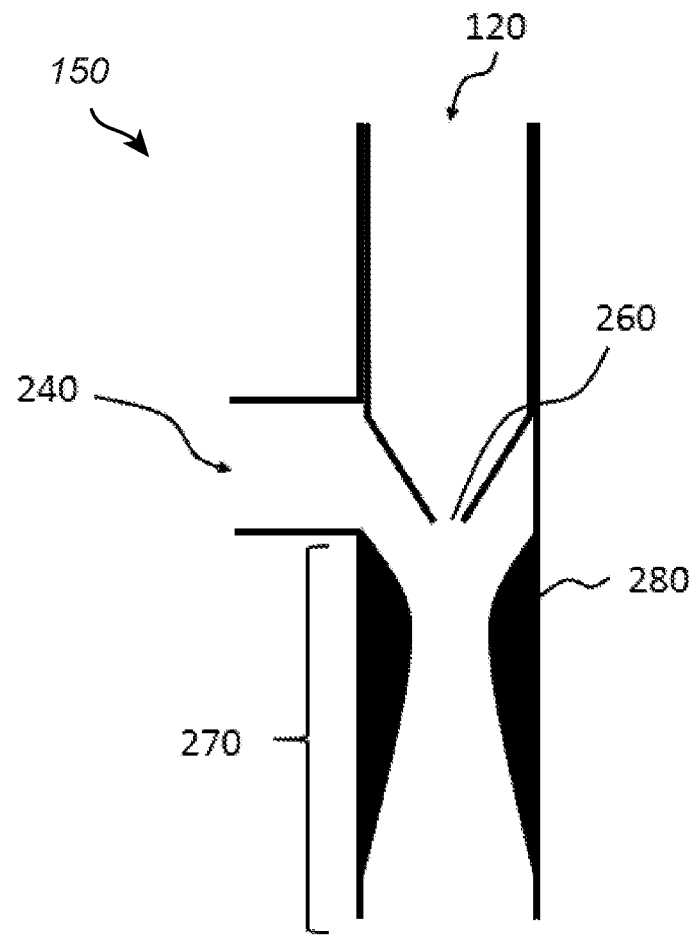
FIG. 5 schematically illustrates a close-up on the injector pump according to a least one possible embodiment of the present invention.

FIG. 5 schematically illustrates a close-up on the injector pump 150 according to a least one possible embodiment of the present invention. The passage 270 immediately after the narrowing passage 260 in the flow direction may be a passage with straight walls as seen in FIG. 3. As seen in FIG. 5 the passage 270 immediately after the narrowing passage 260 in the flow direction may have second narrowing section 280, that may further increase the flow velocity trough said injector pump 150. The second narrowing section 280 may preferably be arranged after the second inlet passage 240 in the flow direction. The passage 270 may be flared and the passage may expand so that the diameter of the channel 170 may be larger than the diameter of the inlet passage 120. This may also provide a larger flow rate and/or flow velocity through the injector pump 150. The passage 270 may have any form or shape that is known in the art to achieve an increased flow velocity and/or flow rate through said pump.

Figure 6:
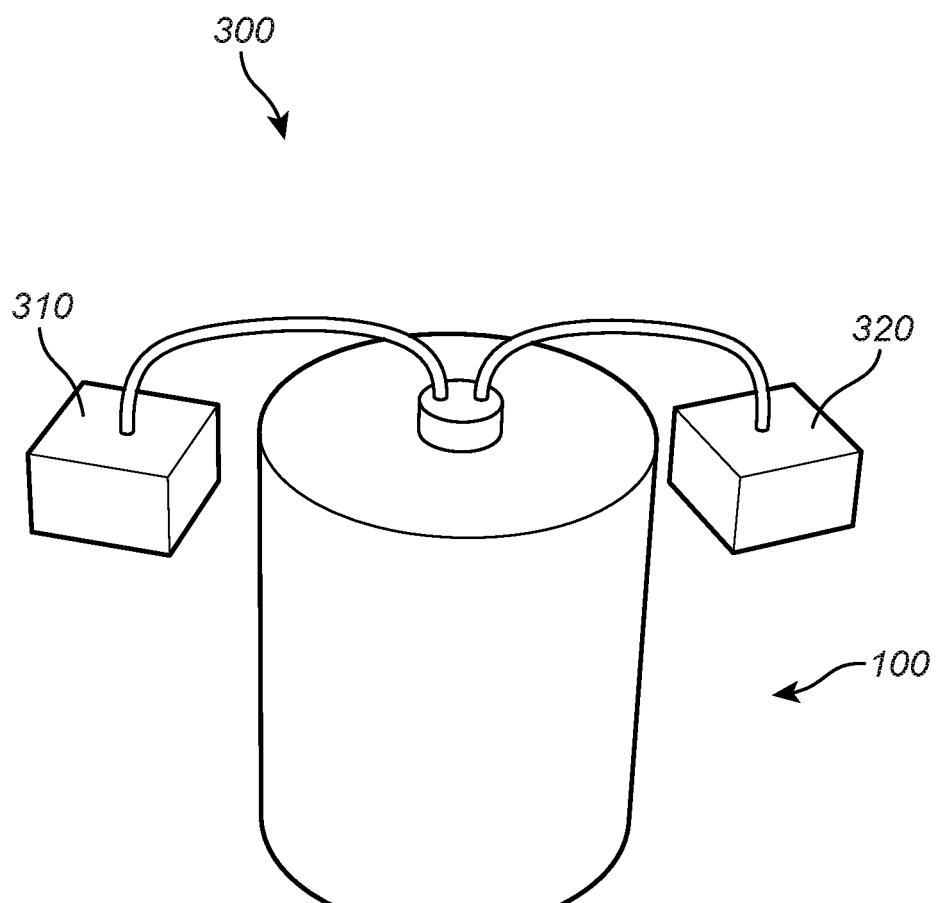
FIG. 6 schematically illustrates a water purification system according to at least one possible embodiment of present invention.

FIG. 6 schematically illustrates a water purification system 300 comprising one water filter unit 100 according to any preceding embodiment of present invention. The system also comprises a feed pump 310 for feeding pressurized water to said at least one water filter unit 100.

The feed pump 310 in FIG. 6 may feed the pressurized water to the at least one water filter unit 100 using a pulsating pressure.

This may provide for increased functionality of the filter unit 100 because of turbulence being induced by the pulsating pressure from the feed pump 310. The turbulence may help keeping particles from not getting stuck in the filter membrane 130 and hence this may provide for a reduced requirement for maintenance and hence a longer lifespan for a possibly sealed water filter unit 100 may be provided. The feed pump may feed the pressurized water to the at least one water filter unit 100 using a constant pressure. The feed pump may feed the pressurized water to the at least one water filter unit 100 using an alternating pressure. By alternating pressure may be meant a pressure that changes over time. By constant pressure may be meant a pressure that is kept the same over time. By pulsating pressure may be meant a pressure that changes over time with a cyclic characteristic. In other words, by a pulsating pressure may be meant a pressure alternating over time, alternating between a target value and a lower value. Said target value may be dependent on the desired pressure at the filter input and said lower value may be close to no pump pressure.

The feed pump 310 may deliver a feed pressure of preferably at least 18 bar, more preferably within the range of 18-24 bar. With other words, the pressure of the water fed to the filter unit may be delivered at, at least 18 bar, more preferably within the range of 18-24 bar. This may provide the injector pump 150 to function without electrical components since the pressure from the feed pump drives the injector pump 150. The pressure within the filter unit may preferably be at least 15 bar, more preferably within the range of 15-18 bar.

The purified water may be fed from the filter unit 100 to a storage tank 320 for storing clean water.

Figure 7:
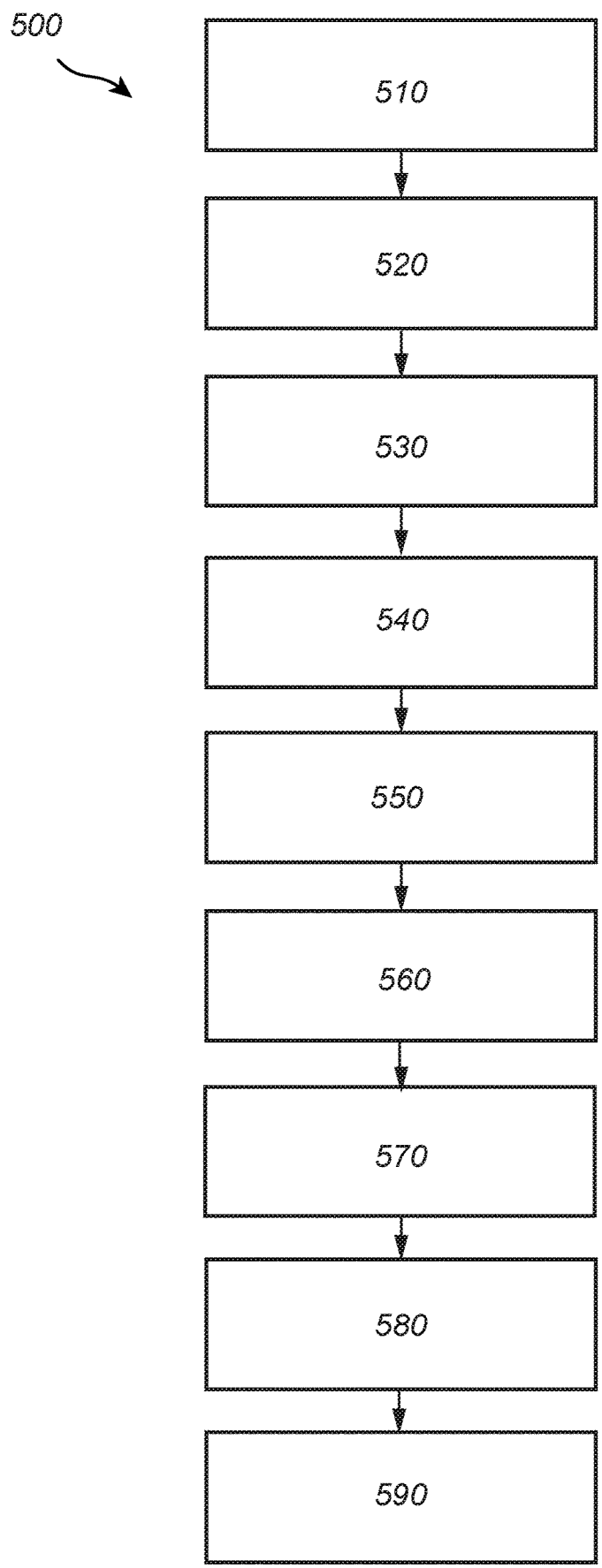
FIG. 7 schematically illustrates a method for manufacturing a filter unit according to present invention.

FIG. 7 schematically illustrates a method for manufacturing a filter unit according to present invention. FIG. 7 shows a method 500 of manufacturing a water filter unit 100 comprising a filter membrane 130 wherein the filter membrane 130 may be arranged around an elongated pipe 160. The method 500 comprises connecting 510 the injector pump to a channel 170. The method also comprises assembling 520 the injector pump 150, with the channel 170 connected, to the filter membrane 130 so that said channel 170 may be arranged within said elongated pipe 160 creating a passage between said elongated pipe 160 and said channel 170. The method further comprises assembling 530 the wall section 110 to the filter membrane 130. The method also comprises assembling 540 a first end section 111 and a second end section 112 to said wall section 110 creating a filter housing. The method comprises sealing 550 said first end section 111 to said wall section 110 and said wall section 110 to said second end section 112.

This provides for a method of manufacturing a water filter unit according to the present inventive concept. This may provide a water filter requiring no maintenance or a very low amount of maintenance since there may be no moving parts within the filter nor the injector pump. This may also provide a compact water filter since the injector pump may be arranged at least partly within said containment, i.e. at least partly within said water filter unit.

The method 500 may further comprise applying 560 a connection 220 to the second end section 112. The method may comprise connecting 570 a vacuum pump 310 to the water inlet 120 and connecting 580 a container for uncured curable plastic to said connection 220. The method may further comprise evacuating 590 said filter housing with said vacuum pump so that said curable plastic may be sucked into said second section of said filter housing;

Other openings on the filter unit 100 may be temporarily sealed during evacuation of the filter unit 100. Preferably, the first water outlet 140 may be sealed during evacuation of the filter unit. The vacuum pump 310 may then be switched off in order for the curable plastic 200 to settle properly. Switching of the vacuum pump may provide for improved sealing by the curable plastic 200 since air channels within the plastic may otherwise be present in the cured plastic 200. The curable plastic 200 may be thermosetting plastic or any plastic material suitable to be cured with time. The curable plastic 200 may be epoxy or any material suitable to be cured according to the described process. After the curable plastic is cured the air may be let inside the filter unit 100.

The person skilled in the art realizes that the present invention by no means is limited to the preferred embodiments described above. On the contrary, many modifications and variations are possible within the scope of the appended claims. For example, the injector pump 150 may be any pump without any moving parts. Another example is the channel 170 within the elongated pipe 160, that may have different orientations, shapes, dimensions and/or sizes than those depicted/described. Yet another example is the curable plastic material that may be any material suitable to be cured.

The invention claimed is:

1. A water filter unit for purifying pressurized water fed to the water filter unit, said water filter unit comprising;
    a containment defined by a wall section, a first end section and a second end section, wherein the wall section is attached to the first end section and the second end section;
    a water inlet arranged in said first or second end section through which the pressurized water is fed into the containment;
    a filter membrane arranged in said containment such that at least part of the water is fed through the filter membrane;
    a first water outlet for filtered water from the membrane;
    wherein the water filter unit further comprises an injector pump arranged to increase the flow velocity of said pressurized water fed to the filter membrane, and said injector pump is furthermore arranged to receive unfiltered water not fed through the membrane and recirculate said unfiltered water within the containment;
    wherein the water filter unit further comprises an elongated pipe with a perforated wall connected to the first water outlet, wherein the filter membrane is a reverse osmosis filter membrane arranged around said elongated pipe and the filtered water enters the elongated pipe via the perforations in the elongated pipe when the water is being fed to the water filter unit;
    and wherein the water filter unit further comprises a channel arranged for transporting the pressurized water and the recirculated water from said injector pump to said filter membrane;
    wherein said channel is arranged within the elongated pipe such that a passage between said elongated pipe and said channel is formed.

2. The water filter unit according to claim 1 wherein the injector pump is at least partly arranged in one of the first end section and the second end section.

3. The water filter unit according to claim 2 wherein the channel is in connection with said injector pump and wherein said channel is arranged off-centered within said elongated pipe at least at one end of said elongated pipe.

4. The water filter unit according to claim 1 wherein the channel is in connection with said injector pump and wherein said channel is arranged off-centered within said elongated pipe at least at one end of said elongated pipe.

5. The water filter unit according to claim 1 wherein the injector pump comprises the water inlet and a narrowing passage, wherein the narrowing passage has a diameter, D2, and the water inlet has a diameter, D1, wherein D2 is smaller than D1.

6. The water filter unit according to claim 5 wherein the injector pump comprises a second inlet passage, the narrowing passage is arranged at a distance, H, as measured from the center of said second inlet passage to the narrowing passage, wherein said distance H is within the range −1*D1 to 1.5*D1 with a negative value for H indicating that the narrowing passage is positioned downstream from said second inlet passage and a positive value for H indicating that the narrowing passage is positioned upstream from said second inlet passage, and said injector pump is furthermore arranged to receive unfiltered water through said second inlet passage.

7. The water filter unit according to claim 5 wherein the ratio D1/D2 is at least 1.4.

8. The water filter unit according to claim 1 wherein at least part of the wall section is attached to the at least part of the filter membrane.

9. The water filter unit according to claim 1 wherein the injector pump is arranged within said containment and wherein;
    said injector pump is further arranged to receive the pressurized water from the water inlet.

10. The water filter unit according to claim 1 wherein the water filter unit comprises a second outlet for at least part of the unfiltered water.

11. The water filter unit according to claim 1 wherein the water filter unit further comprises a capillary tube enabling venting of the water filter unit.

12. The water filter unit according to claim 1 wherein the wall section is permanently sealed to at least one of the first end section and the second end section.

13. A water purification system comprising at least one water filter unit according to claim 1, each of the at least one water filter unit being configured to have all of the limitations of claim 1, and a feed pump for feeding the pressurized water to each of said at least one water filter unit.

14. The water purification system according to claim 13 wherein the feed pump feeds the pressurized water to the at least one water filter unit using a pulsating pressure.

15. A method of manufacturing a water filter unit according to claim 1 wherein the filter membrane is arranged around the elongated pipe, wherein said method comprises;
    connecting the injector pump to a channel;
    assembling the injector pump, with the channel connected, to the filter membrane so that said channel is arranged within said elongated pipe creating a passage between said elongated pipe and said channel;
    assembling the wall section to the filter membrane;
    assembling a first end section and a second end section to said wall section creating a filter housing;
    sealing said first end section to said wall section and said wall section to said second end section.

16. The method according to claim 15 wherein said method comprises
    applying a connection to the second end section;
    connecting a vacuum pump to the water inlet and connecting a container for uncured curable plastic to said connection;

evacuating said filter housing with said vacuum pump so that said curable plastic is sucked into said second section of said filter housing.

\* \* \* \* \*